US011937122B2

(12) United States Patent
Kanamarlapudi et al.

(10) Patent No.: US 11,937,122 B2
(45) Date of Patent: Mar. 19, 2024

(54) SELF-REPORTABLE RADIO LINK CONTROL STATUS PROTOCOL DATA UNITS

(71) Applicant: QUALCOMM INCORPORATED, San Diego, CA (US)

(72) Inventors: Sitaramanjaneyulu Kanamarlapudi, San Diego, CA (US); Prasad Reddy Kadiri, San Diego, CA (US); Leena Zacharias, San Jose, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/248,507

(22) Filed: Jan. 27, 2021

(65) Prior Publication Data

US 2021/0243643 A1 Aug. 5, 2021

Related U.S. Application Data

(60) Provisional application No. 63/006,654, filed on Apr. 7, 2020, provisional application No. 62/968,063, filed on Jan. 30, 2020.

(51) Int. Cl.
*H04W 28/02* (2009.01)
*H04L 47/34* (2022.01)

(52) U.S. Cl.
CPC ......... *H04W 28/0278* (2013.01); *H04L 47/34* (2013.01)

(58) Field of Classification Search
CPC .. H04W 28/0278; H04L 47/34; H04L 1/1896; H04L 1/1642; H04L 1/1832; H04L 1/1848; H04L 1/1864
See application file for complete search history.

(56) References Cited

U.S. PATENT DOCUMENTS 10,880,222 B2 * 12/2020 Hong ................ H04L 1/1621
2011/0041024 A1 2/2011 Burbidge et al.
(Continued)

FOREIGN PATENT DOCUMENTS

CN 101933253 A 12/2010
CN 103327536 A 9/2013
(Continued)

OTHER PUBLICATIONS

Huawei et al., "ACK_SN for Partial Status PDU", 3GPP Draft, 3GPP TSG-RAN WG2 #85bis, R2-141613_ACK_SN for Partial Status PDU V0.5, 3rd Generation Partnership Project (3GPP), Mobile Competence Centre, 650, Route Des Lucioles, F-06921 Sophia-Antipolis Cedex, France, vol. RAN WG2, No. Valencia, Spain, Mar. 31, 2014-Apr. 4, 2014 Mar. 22, 2014 (Mar. 22, 2014), XP050792761, 3 Pages, Retrieved from the Internet: URL:http://www.3gpp.org/ftp/Meetings_3GPP_SYNC/RAN2/Docs/ [retrieved on Mar. 22, 2014].
(Continued)

*Primary Examiner* — Donald L Mills
(74) *Attorney, Agent, or Firm* — Haynes and Boone, LLP

(57) ABSTRACT

Wireless communication systems and methods related to radio link control (RLC) transmissions are provided. A first wireless communication device transmits a sequence of protocol data units (PDUs). The first wireless communication device receives a first reception status report for a first portion of a receiver buffer window used for receiving the sequence of PDUs from a second wireless communication device. The first wireless communication device receives a second reception status report for a second portion of the receiver buffer window, the second portion being different from the first portion, from the second wireless communication device.

29 Claims, 9 Drawing Sheets

(56) References Cited

U.S. PATENT DOCUMENTS

| | | | |
|---|---|---|---|
| 2014/0192822 A1 | 7/2014 | Chun et al. | |
| 2017/0012745 A1 | 1/2017 | Yang | |
| 2018/0324641 A1* | 11/2018 | Tsai | H04W 28/065 |
| 2019/0215717 A1* | 7/2019 | Lee | H04W 24/10 |
| 2020/0178104 A1* | 6/2020 | Kim | H04W 24/10 |
| 2020/0196185 A1* | 6/2020 | Babaei | H04W 72/21 |

FOREIGN PATENT DOCUMENTS

| | | |
|---|---|---|
| CN | 107104764 A | 8/2017 |
| WO | 2019104979 A1 | 6/2019 |

OTHER PUBLICATIONS

International Search Report and Written Opinion—PCT/US2021/015568—ISA/EPO—dated May 17, 2021.

* cited by examiner

SELF-REPORTABLE RADIO LINK CONTROL STATUS PROTOCOL DATA UNITS

CROSS REFERENCE TO RELATED APPLICATIONS

The present application claims priority to and the benefit of U.S. Provisional Patent Application No. 62/968,063, filed Jan. 30, 2020, and U.S. Provisional Patent Application No. 63/006,654, filed Apr. 7, 2020, which are hereby incorporated by reference in their entirety as if fully set forth below and for all applicable purposes.

TECHNICAL FIELD

This application relates to wireless communication systems, and more particularly to Radio Link Control (RLC) transmissions in acknowledged mode.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Among the communication layers employed by 5G NR is the Radio Link Control (RLC) layer, which is responsible for packet segmentation and assembly, in-sequence delivery of data units to higher layers (e.g., a Packet Data Convergence Protocol (PDCP) layer), and error control procedures. The RLC layer may operate in Acknowledged Mode (AM), Unacknowledged Mode (UM), and/or Transparent Mode (TM).

In AM, a device may transmit data as a sequence of protocol data units (PDUs)—some of which may not be successfully delivered—to a receiving device. As part of the error control procedures employed by AM, a receiving device may send a status PDU to the transmitting device. The status PDU may include an acknowledgement (ACK) indicating which PDUs were successfully received, along with a negative acknowledgement (NACK) indicating which PDUs failed to be received. The transmitting device, after processing the status PDU, may then retransmit the data PDUs for which delivery failed, as indicated by the NACK.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication comprises: transmitting, by a first wireless communication device, a sequence of protocol data units (PDUs); receiving, by the first wireless communication device from a second wireless communication device, a first reception status report for a first portion of a receiver buffer window used for receiving the sequence of PDUs; and receiving, by the first wireless communication device from the second wireless communication device, a second reception status report for a second portion of the receiver buffer window, the second portion being different from the first portion.

In an additional aspect of the disclosure, a method of wireless communication comprises: receiving, by a first wireless communication device from a second wireless communication device, a sequence of protocol data units (PDUs); transmitting, by the first wireless communication device to the second wireless communication device, a first reception status report for a first portion of a buffer window used for receiving the sequence of PDUs; and transmitting, by the first wireless communication device to the second wireless communication device, a second reception status report for a second portion of the buffer window, the second portion being different from the first portion.

In an additional aspect of the disclosure, an apparatus including a transceiver configured to transmit a sequence of protocol data units (PDUs); receive from a wireless communication device a first reception status report for a first portion of a receiver buffer window used for receiving the sequence of PDUs; and receive from the wireless communication device a second reception status report for a second portion of the receiver buffer window, the second portion being different from the first portion.

In an additional aspect of the disclosure, an apparatus including a transceiver configured to receive from a wireless communication device a sequence of protocol data units (PDUs); transmit to the wireless communication device a first reception status report for a first portion of a receiver buffer window used for receiving the sequence of PDUs; and transmit to the wireless communication device a second reception status report for a second portion of the receiver buffer window, the second portion being different from the first portion.

In an additional aspect of the disclosure, a non-transitory computer-readable medium having program code recorded thereon, the program code including code for causing a first wireless communication device to transmit a sequence of protocol data units (PDUs); code for causing the first wireless communication device to receive from a second wireless communication device a first reception status report for a first portion of a receiver buffer window used for receiving the sequence of PDUs; and code for causing the first wireless communication device to receive from the second wireless communication device a second reception status report for a second portion of the receiver buffer window, the second portion being different from the first portion.

In an additional aspect of the disclosure, a non-transitory computer-readable medium having program code recorded thereon, the program code including code for causing a first wireless communication device to receive from a second wireless communication device a sequence of protocol data units (PDUs); code for causing the first wireless communication device to transmit to the second wireless communication device a first reception status report for a first portion of a receiver buffer window used for receiving the sequence of PDUs; and code for causing the first wireless communication device to transmit to the second wireless communication device a second reception status report for a second portion of the receiver buffer window, the second portion being different from the first portion.

In an additional aspect of the disclosure, an apparatus including means for transmitting a sequence of protocol data units (PDUs); means for receiving from a wireless communication device a first reception status report for a first portion of a receiver buffer window used for receiving the sequence of PDUs; and means for receiving from the wireless communication device a second reception status report for a second portion of the receiver buffer window, the second portion being different from the first portion.

In an additional aspect of the disclosure, an apparatus including means for receiving from a wireless communication device a sequence of protocol data units (PDUs); means for transmitting to the wireless communication device a first reception status report for a first portion of a receiver buffer window used for receiving the sequence of PDUs; and means for transmitting to the wireless communication device a second reception status report for a second portion of the receiver buffer window, the second portion being different from the first portion.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
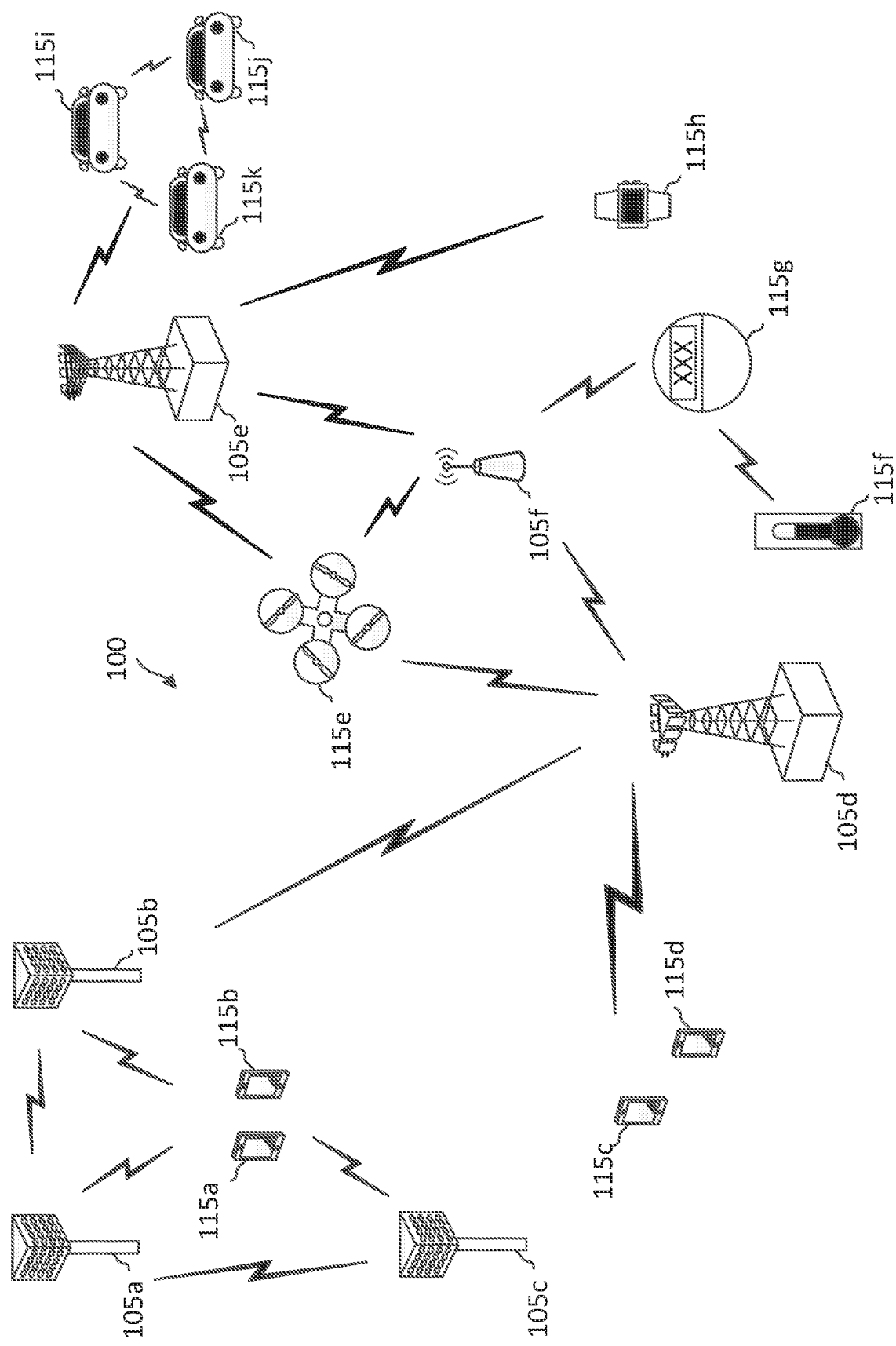
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-1-DMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

When operating in RLC acknowledged mode (AM), a transmitting device may transmit Radio Link Control (RLC) data to a receiving device as a sequence of protocol data units (PDUs). The transmitting device may assign each PDU in the sequence a sequence number (SN) in sequential order. The SNs may allow the transmitting device and the receiving device to track the delivery status of each PDU and may assist the receiving device in performing packet reassembly (e.g., when packet segmentation is performed by the transmitting device's RLC entity). For instance, the transmitting device may maintain and track transmitted PDUs using a transmission window and the receiving device may maintain and track received PDUs using a receiving window. The receiving device may prepare and transmit an RLC status PDU including information regarding which PDUs were received and which were not.

For instance, the RLC status PDU may include an acknowledgement sequence number (ACK_SN) field and may further include one or more non-acknowledgement sequence number (NACK_SN) fields. The NACK_SN fields indicate the SNs of data PDUs within the receiving window that were not successfully delivered to the receiver. The ACK_SN field indicates the SN of the next not-received RLC PDU which has not been marked as lost in the NACK_SN fields and also indicates the upper edge of the RLC receiving window. The upper edge of the RLC receiving window may correspond to the end of the last successfully received PDU at the receiving device. For instance, if the last successfully received PDU has a SN of 10, the ACK_SN field may indicate a SN value of 11. In some instances, the RLC receiving window may also be referred to as an RLC AM reassembly window or an RLC AM reordering window. The RLC status PDU may typically represent the complete status of the receiving window and may not be segmented into smaller units to be transmitted separately. In some power-limited or grant-limited conditions (as with narrowband NR or IOT devices), the network may be unable to accommodate a status PDU large enough to transmit the required number of NACK_SN fields. In other words, the network may not be able to allocate a sufficient amount of bandwidth for the receiving device to transmit a complete status of the receiving window. Under these circumstances, RLC status PDU transmission may fail, and RLC error recovery procedures may be adversely affected.

The present application describes mechanisms for reporting a complete status of an RLC receiving window using multiple self-reportable RLC status reports. In other words, an RLC receiving entity (e.g., a receiver) may send multiple RLC status reports to an RLC transmitting entity (e.g., a transmitter), where each RLC status report may provide a reception status of a segment or a portion of the RLC receiving window. For example, a receiver may prepare a status PDU of various types after receiving a transmission. The type may be indicated by setting a Control PDU Type (CPT) field in the status PDU.

In some aspects, the CPT value indicates a first type of status PDU. The first type of status PDU may include an END_ACK_SN field and a NACK_SN field. The NACK_SN field indicates the SNs of data PDUs that were not successfully delivered to the receiver. The END_ACK_SN field indicates the SN of the next not-received RLC PDU which has not been marked as lost in the NACK_SN field, and does not correspond to the upper edge of the RLC receiving window. In other words, there is one or more successfully received RLC PDUs (in the RLC receiving window) with SNs greater than or equal to the SN in the END_ACK_SN field that are not reported by the status PDU.

In some aspects, the CPT value indicates a second type of status PDU. The second type of status PDU may include an END_ACK_SN field and a NACK_SN field. The NACK_SN field indicates the SNs of data PDUs that were not successfully delivered to the receiver. The END_ACK_SN field indicates the SN of the next not-received RLC PDU which has not been marked as lost in the NACK_SN field. Additionally, the END_ACK_SN field corresponds to the upper edge of the RLC receiving window.

In some aspects, the CPT value indicates a third type of status PDU. The third type of status PDU includes an END_ACK_SN field and a NACK_SN field. The NACK_SN fields indicates the SNs of data PDUs that were not successfully delivered to the receiver. The END_ACK_SN field indicates the SN of the next not-received RLC PDU which has not been marked as lost in the NACK_SN field and does not correspond to the upper edge of the RLC receiving window. Additionally, the third type of status PDU includes a start acknowledgement SN (START_ACK_SN) field. The START_ACK_SN field indicates the inclusive lower bound of SNs for which the status PDU provides information.

In some aspects, the CPT value indicates a fourth type of status PDU. The fourth type of status PDU includes an END_ACK_SN field and a NACK_SN field. The NACK_SN field indicates the SNs of data PDUs that were not successfully delivered to the receiver. The END_ACK_SN field indicates the SN of the next not-received RLC PDU which has not been marked as lost in the NACK_SN field, and corresponds to the upper edge of the receiver's RLC receiving window. Additionally, the fourth type of status PDU includes a START_ACK_SN field. The START_ACK_SN field indicates the inclusive lower bound of SNs for which the status PDU provides information.

Aspects of the present disclosure can provide several benefits by making the status PDU adaptable to different operating conditions. For example, in grant-limited and/or power-limited conditions, the CPT value can be set to indicate whether the END_ACK_SN field indicates the upper edge of the RLC receiving window at a receiver. This allows status information regarding a transmission to be segmented over multiple status PDUs when the information cannot be included within a single PDU (in a single transmission), while keeping each status PDU entirely self-reportable. A status PDU is self-reportable when the status PDU is self-contained and independent from other status PDUs. When the status PDUs are self-contained and independent of each other, the receiver can be transmitted in separate, different transmissions. If one status PDU is lost (e.g., not received by the transmitter), there is no loss of synchronization between the transmitter and the receiver in terms of which PDU is received successfully (or ACK) by the receiver and which PDU is not received successfully (or NACK) by the receiver.

The present disclosure may use the terms "receiver buffer window" and "RLC receiving window" interchangeably.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a 1-DD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Figure 4:
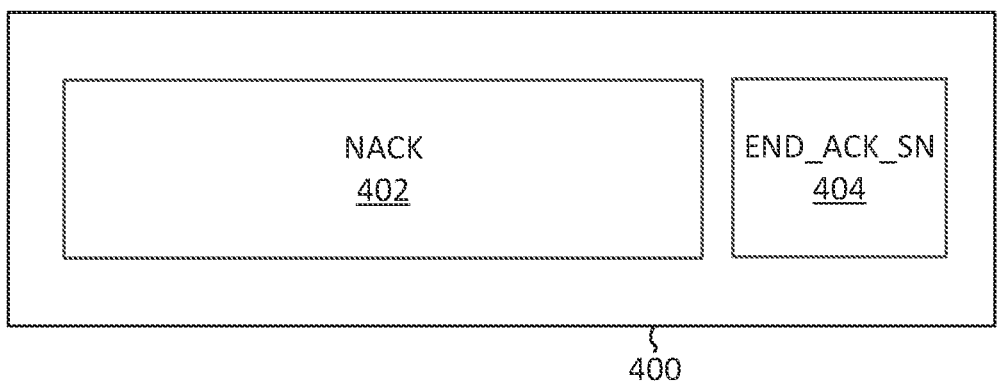
FIG. 4 illustrates an exemplary status report structure according to some aspects of the present disclosure.
Figure 5:
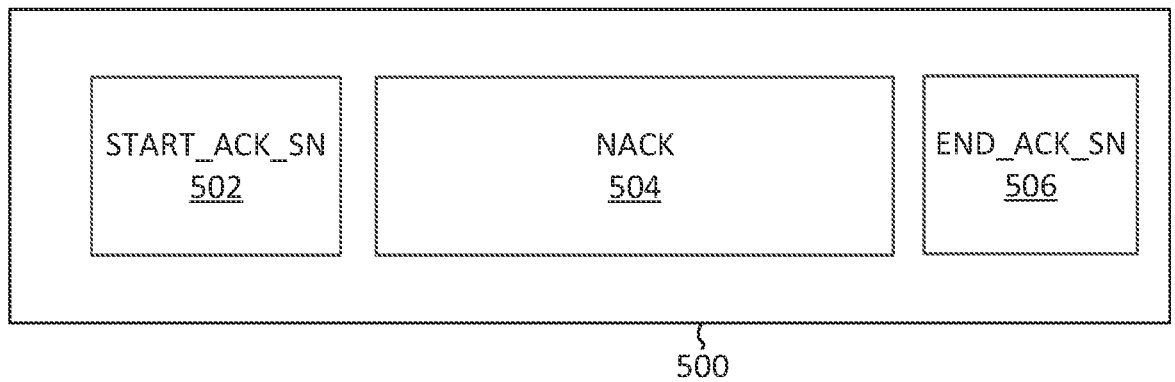
FIG. 5 illustrates an exemplary status report structure according to some aspects of the present disclosure.
Figure 6:
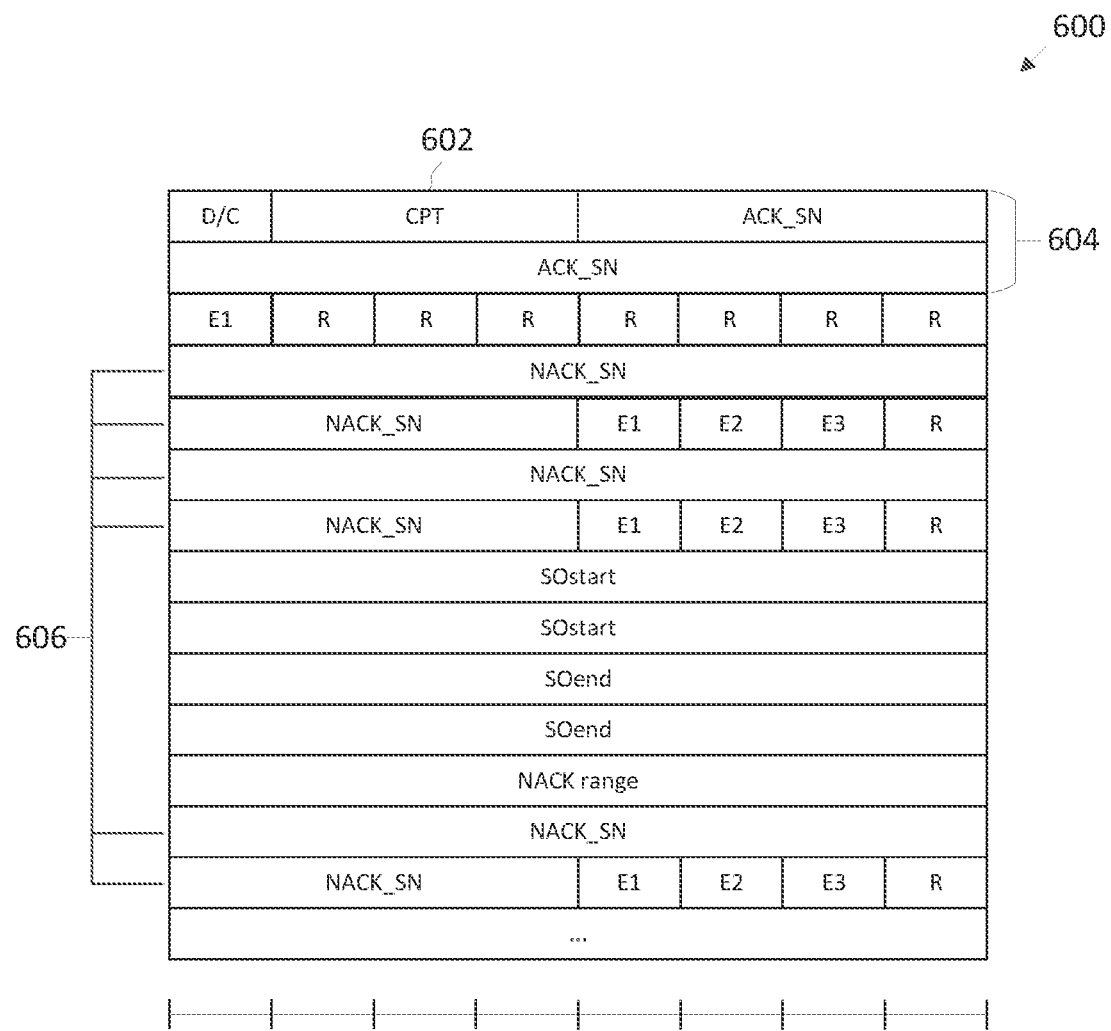
FIG. 6 illustrates a status protocol data unit (PDU) structure according to some aspects of the present disclosure.

In some aspects, the network 100 may implement a radio interface protocol including a packet data convergence protocol (PDCP) layer, a radio link control (RLC) layer, a medium access control (MAC) layer, and a physical (PHY) layer. The PDCP, RLC, and MAC layers may be referred to as Layer 2 (L2). The PHY layer may be referred to as Layer 1 (L1). At a transmitter side (e.g., a BS 105 or a UE 115), a PDCP layer may receive data packets from an upper layer (e.g., transmission control protocol/Internet protocol (TCP/IP) layer) and transport the data packets via an RLC layer, a MAC layer, and a PHY layer for over-the-air (OTA) transmission. At a receiver side, data packets are received OTA via a PHY layer, a MAC layer, an RLC layer, and a PDCP layer, which delivers the data packets to an upper layer. The RLC layer at the transmitter may perform segmentation and the RLC layer. The receiver may perform reassembly and in-sequence delivery of data units to higher layers, and error control procedures (e.g., automatic repeat request (ARQ)). The RLC layer may operate in Acknowledged Mode (AM), Unacknowledged Mode (UM), and/or Transparent Mode (TM). For example, in AM, a BS 105 may transmit data as a sequence of protocol data units (PDUs) to a UE 115, some of which may not be successfully delivered. As part of the error control procedures employed by the network 100, the UE 115 may send a status PDU to the BS 105. The status PDU may include an acknowledgement (ACK) indicating which PDUs were successfully received, along with a negative acknowledgement (NACK) indicating which PDUs failed to be received. Portions of the status PDU may be configured as illustrated in FIGS. 4-6. The BS 105, after processing the status PDU, may then retransmit the data PDUs for which delivery failed, as indicated by the NACK.

Figure 2:
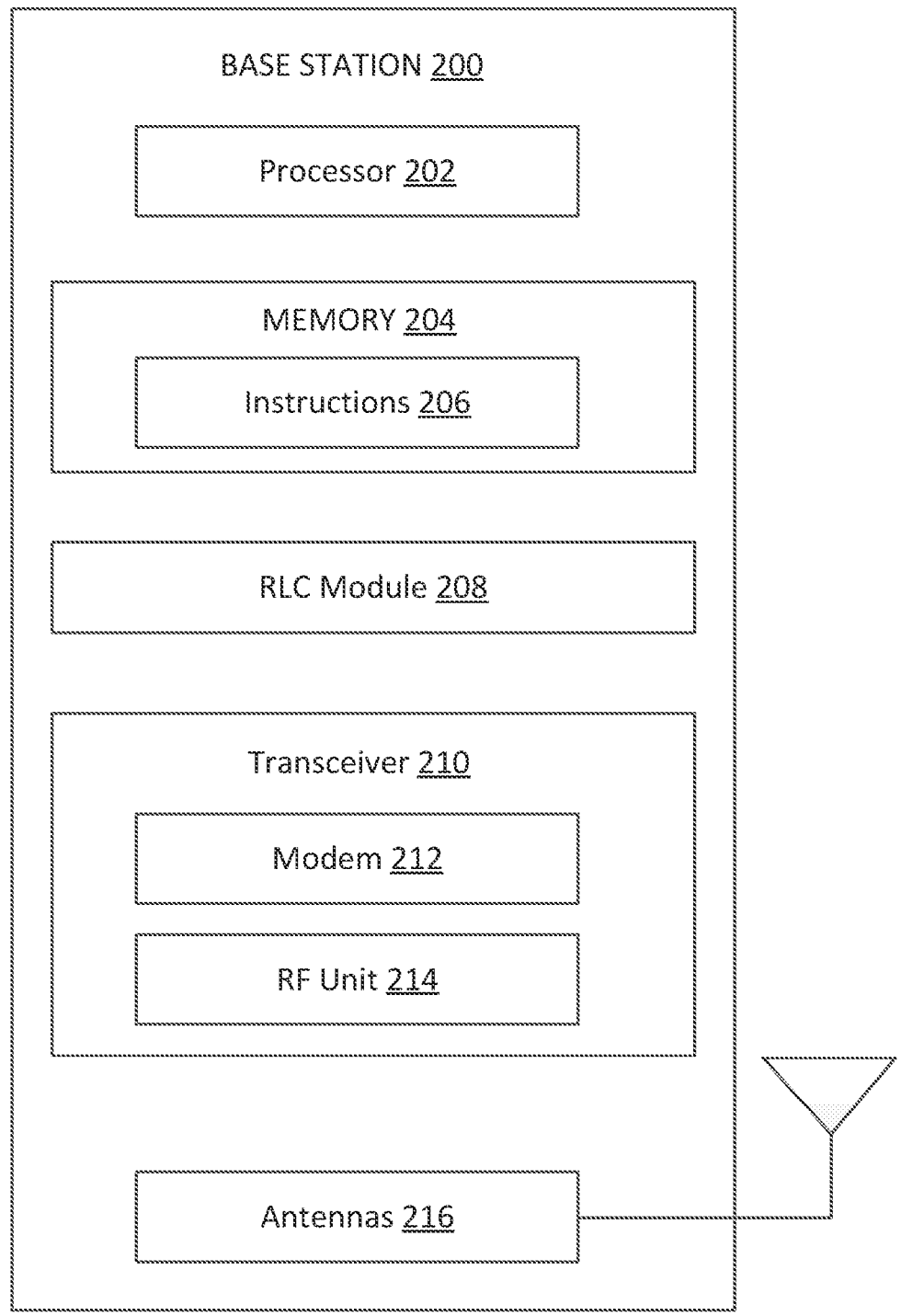
FIG. 2 is a block diagram of an exemplary base station (BS) according to some aspects of the present disclosure.

FIG. 2 is a block diagram of an exemplary BS 200 according to some aspects of the present disclosure. The BS 200 may be a BS 105 in the network 100 as discussed above in FIG. 1. As shown, the BS 200 may include a processor 202, a memory 204, an RLC module 208, a transceiver 210 including a modem subsystem 212 and a RF unit 214, and one or more antennas 216. These elements may be in direct or indirect communication with each other, for example via one or more buses.

The processor 202 may have various features as a specific-type processor. For example, these may include a CPU, a DSP, an ASIC, a controller, a FPGA device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 204 may include a non-transitory computer-readable medium. The memory 204 may store instructions 206. The instructions 206 may include instructions that, when executed by the processor 202, cause the processor 202 to perform operations described herein, for example, aspects of FIGS. 4-10. Instructions 206 may also be referred to as program code. The program code may be for causing a wireless communication device to perform these operations, for example by causing one or more processors (such as processor 202) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The RLC module 208 may be implemented via hardware, software, or combinations thereof. For example, the RLC module 208 may be implemented as a processor, circuit, and/or instructions 206 stored in the memory 204 and executed by the processor 202. In some examples, the RLC module 208 can be integrated within the modem subsystem 212. For example, the RLC module 208 can be implemented by a combination of software components (e.g., executed by a DSP or a general processor) and hardware components (e.g., logic gates and circuitry) within the modem subsystem 212.

The RLC module 208 may be used for various aspects of the present disclosure, for example, aspects of FIGS. 4-10. The RLC module 208 is configured to prepare a sequence of data PDUs and transmit the sequence of data PDUs to, for example, a UE 115. The sequence of data PDUs may be transmitted using the transceiver 210 and the antennas 216. Afterwards, the RLC module 208 may receive one or more status reports, for example, in the form of RLC status PDUs, from the UE 115, by way of the antennas 216 and the transceiver 210, indicating which data PDUs were successfully received and which were not. The status reports may be configured as in FIGS. 4-6. Each status report may correspond to a different portion of a receiver buffer window (at the UE 115). The RLC module 208 may process the status reports to determine which of the transmitted PDUs were not received by the UE 115. Afterwards, the RLC module 208 may again transmit, via the transceiver 210 and the antennas 216, the data PDUs which the UE 115 reported as not received. In some aspects, the RLC module 208 is further configured to receive a UE capability report, for example, from a UE 115, indicating whether the UE is capable of reporting multiple RLC status reports for different portions or segments of a receiver buffer window of the UE. For instance, an RLC status report may include an indication indicating whether the RLC status report includes status information for less than the entire receiver buffer window. The RLC module 208 is further configured to configure the UE (e.g., via RRC) to enable reporting RLC reception status for less than the entire receiver buffer window. The RLC module 208 may also be configured to coordinate with MAC layer processing (e.g., implemented by the processor 202) to receive a buffer status report (BSR) after transmitting the first RLC status report. The BSR may indicate the size of the remaining RLC status reports to be transmitted by the UE 115. Alternatively, the RLC module 208 may be further configured to coordinate with MAC layer processing (e.g., implemented by the processor 202) to receive a communication signal (e.g., a transport block) including the BSR and the RLC status report. The BSR may be in the form of a medium access control control element ((MAC CE). BSRs may also be received with or after subsequent RLC status reports.

As shown, the transceiver 210 may include the modem subsystem 212 and the RF unit 214. The transceiver 210 can be configured to communicate bi-directionally with other devices, such as the UEs 115 and/or 300 and/or another core network element. The modem subsystem 212 may be configured to modulate and/or encode data according to a MCS, e.g., a LDPC coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data (e.g., RRC configuration or RLC data PDUs) from the modem subsystem 212 (on outbound transmissions) or of transmissions originating from another source such as a UE 115 and/or UE 300. The RF unit 214 may be further configured to perform analog beamforming in conjunction with the digital beamforming. Although shown as integrated together in transceiver 210, the modem subsystem 212 and/or the RF unit 214 may be separate devices that are coupled together at the BS 105 to enable the BS 105 to communicate with other devices.

The RF unit 214 may provide the modulated and/or processed data, e.g. data packets (or, more generally, data messages that may contain one or more data packets and other information), to the antennas 216 for transmission to one or more other devices. This may include, for example, transmission of information to complete attachment to a network and communication with a camped UE 115 or 300 according to some aspects of the present disclosure. The antennas 216 may further receive data messages transmitted from other devices and provide the received data messages for processing and/or demodulation at the transceiver 210. The transceiver 210 may provide the demodulated and decoded data (e.g., RLC status reports, UE capability reports) to the communication module 208 and configured transmission module 208 for processing. The antennas 216 may include multiple antennas of similar or different designs in order to sustain multiple transmission links.

In some aspects, the transceiver 210 is configured transmit, to a wireless communication device (e.g., a UE 115), a sequence of PDUs, receive, from the wireless communication device, a first reception status report for a first portion of a receiver buffer window used for receiving the sequence of PDUs, and receive, from the wireless communication device, a second reception status report for a second portion of the receiver buffer window, the second portion being different from the first portion, for example, by coordinating with an RLC module 208.

In an aspect, the BS 200 can include multiple transceivers 210 implementing different RATs (e.g., NR and LTE). In an aspect, the BS 200 can include a single transceiver 210 implementing multiple RATs (e.g., NR and LTE). In an aspect, the transceiver 210 can include various components, where different combinations of components can implement different RATs.

Figure 3:
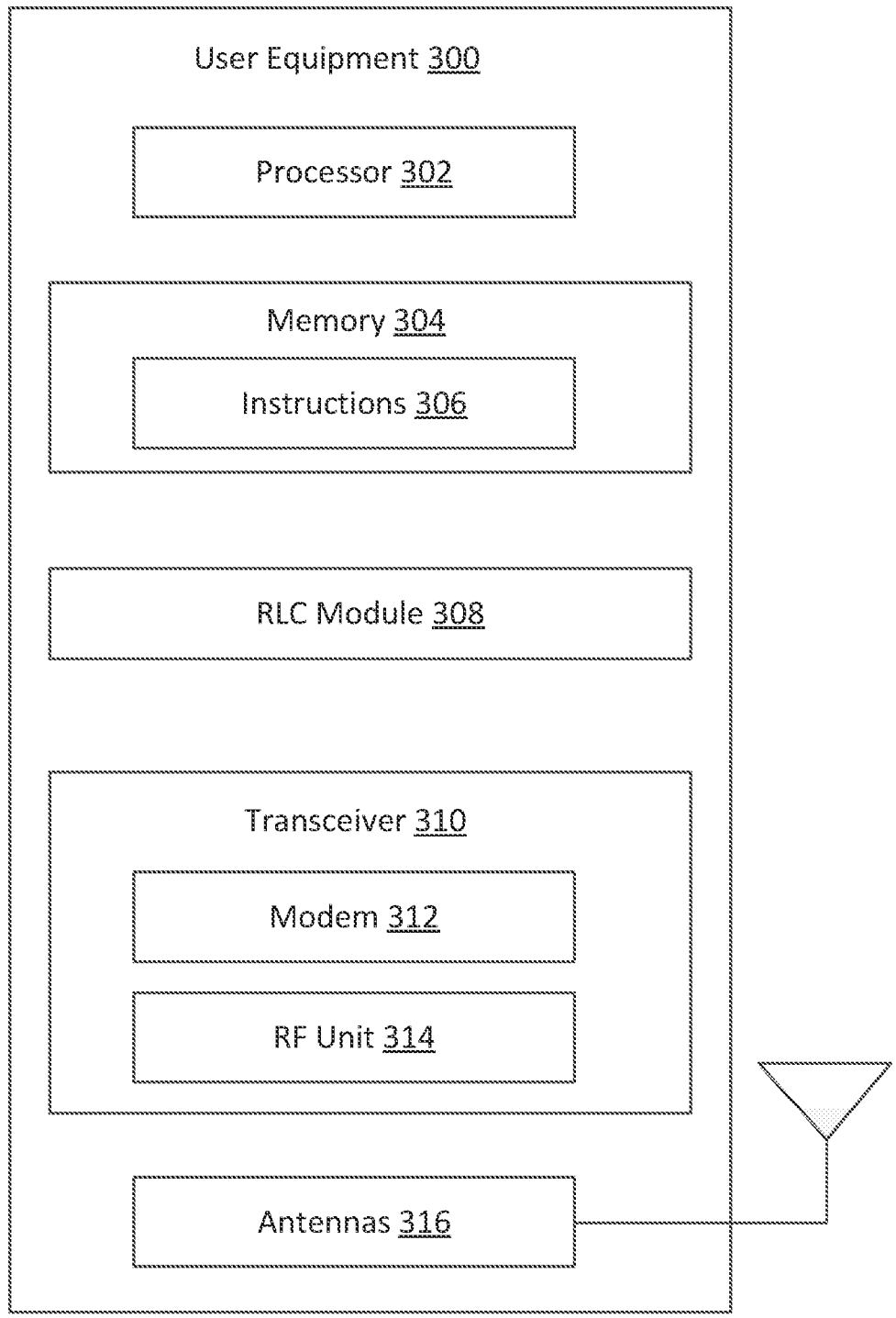
FIG. 3 is a block diagram of an exemplary user equipment (UE) according to some aspects of the present disclosure.

FIG. 3 is a block diagram of an exemplary UE 300 according to some aspects of the present disclosure. The UE 300 may be a UE 115 as discussed above with respect to FIG. 1. As shown, the UE 300 may include a processor 302, a memory 304, an RLC module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with aspects of the present disclosure, for example, aspects of FIGS. 4-10. Instructions 306 may also be referred to as program code, which may be interpreted broadly to include any type of computer-readable statement(s) as discussed above with respect to FIG. 2.

The RLC module 308 may be implemented via hardware, software, or combinations thereof. For example the RLC module 308 may be implemented as a processor, circuit, and/or instructions 306 stored in the memory 304 and executed by the processor 302. In some examples, the RLC module 308 can be integrated within the modem subsystem 312. For example, the RLC module 308 can be implemented by a combination of software components (e.g., executed by a DSP or a general processor) and hardware components (e.g., logic gates and circuitry) within the modem subsystem 312.

The RLC module 308 may be used for various aspects of the present disclosure, for example, aspects of FIGS. 4-10. The RLC module 308 is configured to receive sequences of RLC data PDUs from, for example, a BS 105 or 200, by way of the antennas 316 and the transceiver 310. Each RLC data PDU in the sequence may be assigned a SN in sequential order. The RLC module 308 is configured to store the received RLC data PDUs in a receiver buffer window (e.g., corresponding to a portion of the memory 304). The RLC module 308 may store the received RLC data PDUs in a sequential order based on the SNs of the corresponding PDUs to support error control operations (e.g., ARQ control). The receiver buffer window may be arranged in any arrangement. In some instances, the receiver buffer window may include a list of pointers pointing to physical locations of the memory 304 where the received PDUs are stored. For various reasons, such as a low signal-to-noise (SNR) channel condition, some of the PDUs transmitted by the BS 105 may not be received successfully by the UE 300. The radio link control module 308 may generate a status report—for example, in the form of an RLC status PDU—indicating which data PDUs were received and which were not, and transmit the status report to the BS 105 using the transceiver 310 and the antennas 316. The status report may be one of the various types illustrated in FIGS. 4-6. The type may be indicated using the CPT field of a status PDU. The RLC module 308 may prepare and transmit more than one status report in response to receiving a sequence of RLC data PDUs, with each status corresponding to a portion of the receiver buffer window. The RLC module 308 may then receive a retransmission via the antennas 316 and transceiver 310 of those data PDUs it reported as lost in the status report. The RLC module 308 may again prepare and transmit a status report as described above.

In some aspects, the RLC module 308 is further configured to transmit a UE capability report, for example, to a BS 105 or BS 200, indicating whether the UE 300 is capable of reporting multiple RLC status reports for different portions or segments of the receiver buffer window. For instance, an RLC status report may include an indication indicating whether the RLC status report includes status information for less than the entire receiver buffer window (e.g., the upper edge of the receiver buffer window). The RLC module 308 is further configured to receive a configuration (e.g., an RRC configuration) to enable reporting RLC reception status for less than the entire receiver buffer window. In some aspects, when reporting RLC reception status report with partial receiver buffer window, the RLC module 308 may start an RLC status transmission prohibit timer in response to transmitting an RLC status report including status information up to the upper edge of the receiver buffer window and may not transmit another RLC status report until the RLC status transmission prohibit timer expires. In some aspects, the RLC module 308 may also be configured to coordinate with MAC layer processing (e.g., implemented by the processor 302) to transmit a buffer status report (BSR) after transmitting the first RLC status report. The BSR may indicate the size of the remaining RLC status reports to be transmitted. Alternatively, the RLC module 308 may be further configured to coordinate with MAC layer processing (e.g., implemented by the processor 302) to transmit a communication signal (e.g., a transport block) including the BSR and the RLC status report. The BSR may be in the form of a medium access control control element ((MAC CE). BSRs may also be transmitted with or after subsequent RLC status reports.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304 and/or the RLC module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data (e.g., RLC status reports and UE capability report) from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may include one or more data packets and other information), to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., RLC data PDUs and RRC configuration) to the RLC module 308 for processing. The antennas 316 may include multiple antennas of similar or different designs in order to sustain multiple transmission links. The RF unit 314 may configure the antennas 316.

In some aspects, the transceiver 310 is configured to receive, from a wireless communication device (e.g., a BS 105 or BS 200), a sequence of PDUs, transmit, to the wireless communication device, a first reception status report for a first portion of a buffer window used for receiving the sequence of PDUs, and transmit, to the wireless communication device, a second reception status report for a second portion of the buffer window, the second portion being different from the first portion, for example, by coordinating with an RLC module 308.

In an aspect, the UE 300 can include multiple transceivers 310 implementing different RATs (e.g., NR and LTE). In an aspect, the UE 300 can include a single transceiver 310 implementing multiple RATs (e.g., NR and LTE). In an aspect, the transceiver 310 can include various components, where different combinations of components can implement different RATs.

While FIG. 2 describes the radio control link module 208 at the BS 200 in the context of an RLC transmitting entity and FIG. 3 describes the radio control link module 308 at the UE 300 in the context of an RLC receiving entity, in some embodiments, the radio control link module 208 at the BS 200 may operate as an RLC receiving entity and the radio control link module 308 at the UE 300 may operate as an RLC transmitting entity. In other words, the RLC module 208 may implement at least some functionalities of the RLC module 308 described above. Similarly, the RLC module 308 may implement at least some functionalities of the RLC module 208 described above.

FIG. 4 illustrates an exemplary status report structure 400 according to some aspects of the present disclosure. The status report structure 400 may be implemented by a BS such as the BSs 105 and/or 200 and/or a UE such as the UEs 115 and/or 300 in a network such the network 100. For instance, a transmitter (e.g., a BS 105 or 200) may transmit a sequence of PDUs (e.g., RLC data PDUs) each associated with a SN to a receiver (e.g., a UE 115 or 300). For example, the sequence may include a PDU with a SN of X, followed by a PDU with a SN of X+1, followed by a PDU with a SN of X+2, and so on, where X is an integer. The status report may include a NACK field 402 and an END_ACK_SN field 404 and may be processed by an RLC module 208 or 308. The NACK field 402 may comprise a list of sequence numbers (SNs) corresponding to data PDUs in the sequence that were transmitted by the transmitter, but not received by the receiver. The first SN in the NACK field 402 may correspond to the first SN for which the status report provides status information. The END_ACK_SN field 404 may indicate an exclusive upper bound on the SNs for which the status report includes information. Any SNs in the range between the first SN in the NACK field 402 (inclusive) and END_ACK_SN 404 (exclusive) which are not in the NACK field 402 are successfully received by the receiver. For example, in a status report with the structure 400 providing status information for SNs 1-9, where only the PDUs corresponding to SNs 1, 3, and 5 were not successfully received, NACK 402 may include a list with the elements 1, 3, and 5, and END_ACK_SN 404 may include a value of 10 indicating the SN 10. In a status report with the structure 400 providing status information for SNs 31-499, where only the PDUs corresponding to SNs 31, 33, and 35 were not successfully received, NACK 402 may include a list with the elements 31, 33, and 35, and END_ACK_SN 404 may include a value of 500 indicating the SN 500.

In one aspect, END_ACK_SN 404 may indicate the exclusive upper bound for the SNs for which status information is provided, but may not indicate the upper edge of a receiver buffer window (at the receiver). Alternately, END_ACK_SN 404 may indicate not only the exclusive upper bound for the SNs for which status information is provided, but also the upper edge of the receiver buffer window maintained at the receiver so that END_ACK_SN 404 is also the SN next expected by the receiver.

FIG. 5. illustrates an exemplary status report structure 500 according to some aspects of the present disclosure. The status report structure 500 may be implemented by a BS such as the BSs 105 and/or 200 and/or a UE such as the UEs 115 and/or 300 in a network such as the network 100. For instance, a transmitter (e.g., a BS 105 or 200) may transmit a sequence of PDUs (e.g., RLC data PDUs) each associated with a SN to a receiver (e.g., a UE 115 or 300). The status report structure 500 may be substantially similar to the status report structure 400, but may further indicate a beginning SN for which the status report provides status information. As shown, the status report may include a START_ACK_SN field 502, a NACK field 504, and an END_ACK_SN field 506, and may be processed by an RLC module 208 or 308. The START_ACK_SN field 502 may indicate the first SN for which the status report provides status information. The NACK field 504 may comprise a list of SNs corresponding to data PDUs that were transmitted by, for example, a BS 105 or 200, but not received by a UE 115 or 300. The END_ACK_SN field 506 may indicate an exclusive upper bound on the SNs for which the status report includes information. Any SNs in the range between START_ACK_SN 502 (inclusive) and END_ACK_SN 506 (exclusive) which are not in the NACK field 504 would have been successfully received. For example, in a status report providing status information for SNs 0-9, where only the PDUs corresponding to SNs 1, 3, and 5 were not successfully received, START_ACK_SN 502 could equal 0, NACK 504 could include a list with the elements 1, 3, and 5, and END_ACK_SN 506 could equal SN 10. In a status report providing status information for SNs 30-499, where only the PDUs corresponding to SNs 31, 33, and 35 were not successfully received, START_ACK_SN 502 may have a value of 30 indicating the SN 30, NACK 504 may include a list with the elements 31, 33, and 35, and END_ACK_SN 506 may have a value of 500 indicating the SN 500.

In one aspect, END_ACK_SN 506 may indicate not only the exclusive upper bound for the SNs for which status information is provided, but also the upper edge of the receiver buffer window at the receiver so that END_ACK_SN 506 is also the SN next expected by the receiver.

In some aspect, a status report may have a PDU format including a CPT field (e.g., CPT field 602 of FIG. 6) indicating which of the various RLC status report configuration types described above with respect to FIGS. 4 and 5 is employed in the status report.

FIG. 6 illustrates a status PDU structure 600 according to some embodiments of the present disclosure. The PDU structure 600 may be implemented by a BS such as the BSs 105 and/or 200 and/or a UE such as the UEs 115 and/or 300 in a network such the network 100, for example, for reporting a status report with a structure similar to the structures 400 and 500. The PDU structure 600 is illustrated for reporting statuses for PDUs with a 12-bit SN. In some aspects, the PDU structure 600 is as defined in 3rd Generation Partnership Project (3GPP) Technical Specification 38.322 version 15.5.0 Release 15, titled "3 rd Generation Partnership Project; Technical Specification Group Radio Access Network; NR; Radio Link Control (RLC) protocol specification," March, 2019, which is incorporated herein by reference. Other SN number sizes are possible, for example, 18 bits. The status PDU 600 may include the status report structures defined in FIGS. 4 and 5 in various arrangements. The CPT field 602 may indicate which of the various configurations defined in FIGS. 4-5 a particular status PDU employs as will be discussed further below in FIG. 7. The list of NACK_SN fields 606 and ACK_SN field (shown divided over two octets) 604 may correspond to the NACK_SN fields 402 and 504 and END_ACK_SN fields 404 and 506 of FIGS. 4 and 5.

Figure 7:
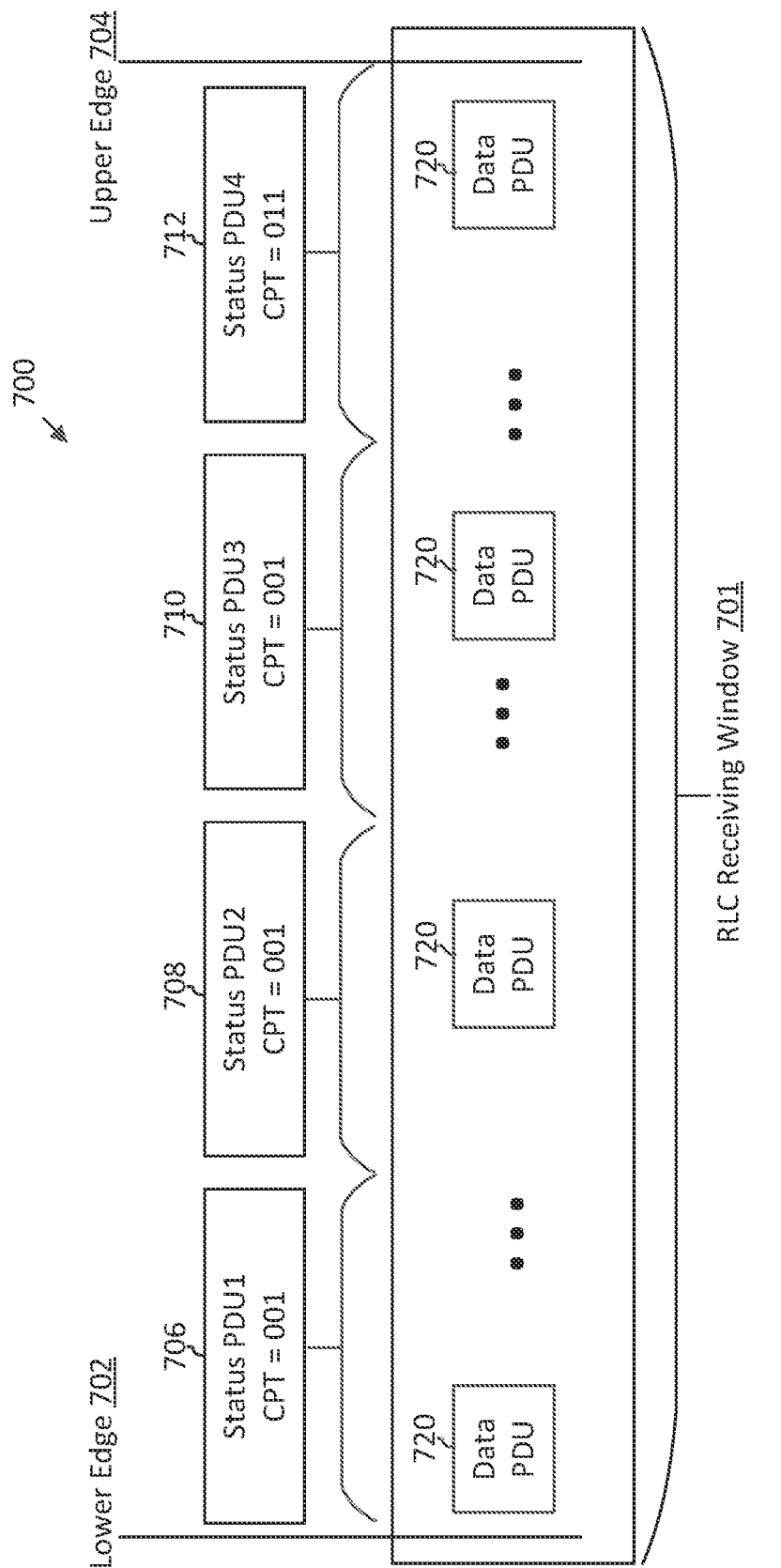
FIG. 7 illustrates a Radio Link Control (RLC) window according to some aspects of the present disclosure.

FIG. 7 illustrates an exemplary RLC status reporting scheme 700 according to some aspects of the present disclosure. The scheme 700 may be implemented by an RLC receiving entity (e.g., the BSs 105 and/or 200 and/or the UEs 115 and/or 300) to support error control (e.g., ARQ control). In particular, the RLC receiving entity may report reception statuses of RLC data PDUs 720 received at the RLC receiving entity and stored at an RLC window 701 as shown in the scheme 700. The RLC receiving window 701 may correspond to a portion of a memory (e.g., the memory 204 and 304) at the RLC receiving entity or receiver. In FIG. 7, the status PDUs 706-712 (shown as status PDU1, status PDU2, status PDU3, and statue PDU4) may be created by an RLC module 308 for the RLC receiving window 701 and transmitted by a transceiver 310 and antennas 316 at a UE 115 or 300, and received by antennas 216 and transceiver 210 and processed by an RLC module 208 at a BS 105 or 200. The status PDUs 706, 708, 710, and 712 may correspond to status reports of the structure 400 or 500 or the PDU format structure 600. The RLC receiving window 701 may correspond to the receiver buffer window described above in FIGS. 4 and 5. As illustrated in the example of FIG. 7, the RLC receiving entity reports the complete status of the RLC receiving window 701 using four status PDUs 706, 708, 710, and 712. Each of the status PDUs 706, 708, 710, and 712 provides a reception status or a segment or portion of the RLC receiving window 701 within a lower edge 702 and an upper edge 704 of the RLC receiving window 701. Each of the status PDUs 706, 708, and 710 may use a first CPT value (e.g., a binary value 001) to indicate that the END_ACK_SN field (e.g., the END_ACK_SN field 404 or 506) in the corresponding status PDU does not correspond to the upper edge 704 of the RLC receiving window 701. The status PDU 712 may use a second CPT value (e.g., a binary value 011) to indicate that the END_ACK_SN field in the PDU 712 corresponds to the upper edge 704 of the RLC receiving window 701—and that the value of END_ACK_SN indicates the next expected data PDU—as described in the sections corresponding to FIGS. 4 and 5 above. The CPT values 001 and 011 are examples only, and other CPT values may be used to indicate the various configurations described above in relation to FIGS. 4 and 5.

In some aspects, the partitioning of the complete status of the RLC receiving window 701 may be based on the size of a granted MAC PDU (e.g., a MAC transport block for transmission in a transmission timer interval (TTI)). For instance, a BS such as the BSs 105 and/or 200 may grant a UE such as the UEs 115 and/or 300 with four scheduling grants each for transmitting a MAC PDU with 50 bytes at different time. The complete status may include 200 bytes. Accordingly, the UE may partition the complete status into four status portions each including 50 bytes so that the each status portion may be transmitted in a MAC PDU.

While FIG. 7 illustrates the RLC receiving entity transmitting four status PDUs to report the complete status of the RLC receiving window 701, in general, the complete status of an RLC receiving window may be partitioned into any suitable number of portions (e.g., about 2, 3, 5 or more), where the reception status for each portion maybe reported using a status PDU similar to the PDUs 706, 708, 710, and/or 712.

Figure 8:
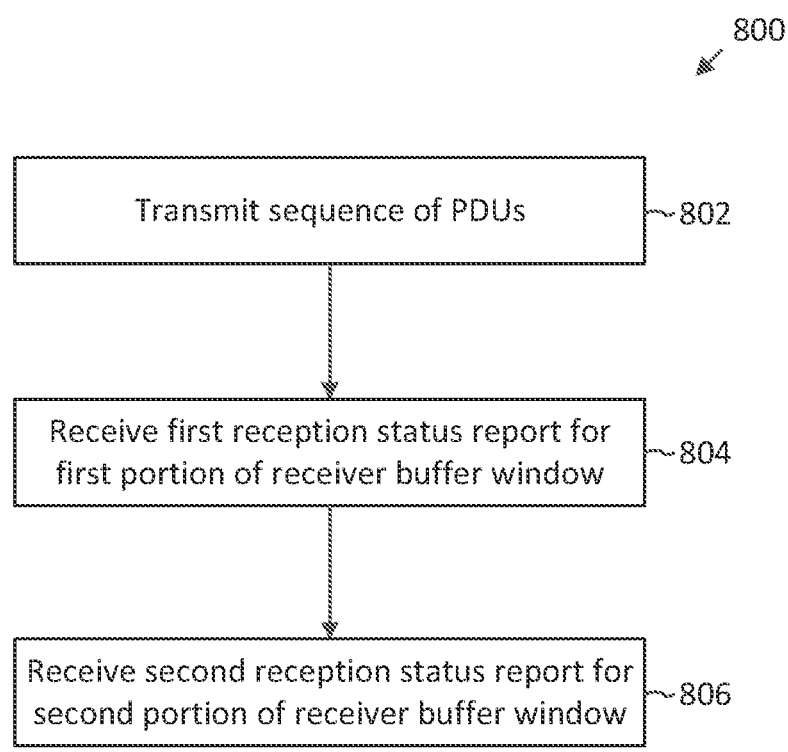
FIG. 8 is a flow diagram of a communication method according to some aspects of the present disclosure.

FIG. 8 is a flow diagram of a communication method 800 according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as the BS 105 or 200, may utilize one or more components, such as the processor 202, the memory 204, the RLC module 208, the transceiver 210, the modem 212, and the one or more antennas 216, to execute the steps of method 800. The method 800 may employ similar mechanisms as described above in FIGS. 4-7. As illustrated, the method 800 includes a number of enumerated steps, but aspects of the method 800 may include additional steps before, after, and in between the enumerated steps. In some aspects, one or more of the enumerated steps may be omitted or performed in a different order.

At block 802, a first wireless communication device transmits a sequence of PDUs to a second wireless communication device. In some instances, the first wireless communication device may correspond to a BS (e.g., the BSs 105 and/or 200) and the second wireless communication device may correspond to a UE (e.g., the UEs 115 and/or 300). In some other instances, the first wireless communication device may correspond to a UE (e.g., the UEs 115 and/or 300) and the second wireless communication device may correspond to a BS (e.g., the BSs 105 and/or 200). In some instances, the sequence of PDUs are RLC data PDUs. In some instances, the first wireless communication device may utilize one or more components, such as the processors 202 and 302, the memory 204 and 304, the RLC modules 208 and 308, the transceivers 210 and 310, the modems 212 and 312, and the one or more antennas 216 and 316, to transmit the sequence of PDUs.

At block 804, the first wireless communication device receives from the second wireless communication device a first reception status report for a first portion of a receiver buffer window used for receiving the sequence of PDUs. In some instances, the first wireless communication device may utilize one or more components, such as the processors 202 and 302, the memory 204 and 304, the RLC modules 208 and 308, the transceivers 210 and 310, the modems 212 and 312, and the one or more antennas 216 and 316, to receive the first reception status report.

At block 806, the first wireless communication device receives from the second wireless communication device, a second reception status report for a second portion of the receiver buffer window, the second portion being different from the first portion. In some instances, the first wireless communication device may utilize one or more components, such as the processors 202 and 302, the memory 204 and 304, the RLC modules 208 and 308, the transceivers 210 and 310, the modems 212 and 312, and the one or more antennas 216 and 316, to receive the second status report.

In some instances, the method 800 further comprises transmitting, by the first wireless communication device to the second wireless communication device, an indication to support reception of a reception status report for a portion of the receiver buffer window other than the entire receiver buffer window. In some instances, the first wireless communication device may utilize one or more components, such as the processors 202 and 302, the memory 204 and 304, the RLC modules 208 and 308, the transceivers 210 and 310, the modems 212 and 312, and the one or more antennas 216 and 316, to transmit the indication to support reception of a reception status report for a portion of the receiver buffer window other than the entire receiver buffer window.

In some instances, the method 800 further comprises receiving a BSR indicating the size of the remaining RLC status reports to be received. A BSR may be received after the first RLC status report is transmitted, or alternately, a BSR may be included with the first RLC status report (e.g., in the same transport block). BSRs may also be received with or after subsequent RLC status reports.

In some instances, each PDU in the sequence of PDUs is associated with an SN and each of the first and second reception status reports comprises a list of SNs associated with PDUs of the sequence of PDUs, wherein each PDU associated with a SN in the list has a NACK status; and an end-acknowledgement SN indicating an exclusive upper bound on PDUs for which information is reported.

In some instances, receiving the second reception status report at block 806 includes receiving, by the first wireless communication device from the second wireless communication device, the second reception status report including a CPT field indicating that the end-acknowledgement SN of the second reception status report further indicates a SN associated with a next expected PDU from the first wireless communication device.

In some instances, the method 800 further comprises transmitting, by the first wireless communication device, a next sequence of PDUs based on the CPT field of the second reception status report. In some instances, the first wireless communication device may utilize one or more components, such as the processors 202 and 302, the memory 204 and 304, the RLC modules 208 and 308, the transceivers 210 and 310, the modems 212 and 312, and the one or more antennas 216 and 316, to transmit the next sequence of PDUs based on the CPT field of the second reception status report In some instances, the method 800 further comprises transmitting a next sequence of PDUs based on at least one of the CPT field or the end-acknowledgement SN of the second reception status report. In some instances, the first wireless communication device may utilize one or more components, such as the processors 202 and 302, the memory 204 and 304, the RLC modules 208 and 308, the transceivers 210 and 310, the modems 212 and 312, and the one or more antennas 216 and 316, to transmit the next sequence of PDUs based on at least one of the CPT field or the end-acknowledgement SN of the second reception status report.

In some instances, receiving the first reception status report at block 804 includes receiving, by the first wireless communication device from the second wireless communication device, the first reception status report including a CPT field indicating that the end-acknowledgement SN of the first reception status report does not indicate a next expected PDU from the first wireless communication device.

In some instances, the first reception status report includes a CPT field indicating that the end-acknowledgement SN of the first reception status report corresponds to the upper edge of the first portion of the receiver buffer window used for receiving the sequence of PDUs.

In some instances, receiving the first reception status report at block 804 further comprises a start-acknowledgement SN indicating an inclusive lower bound on SNs for which the first reception status report provides information.

In some instances, each PDU in the sequence of PDUs comprises an RLC PDU, and each of the first and second reception status reports comprises an RLC status PDU.

Figure 9:
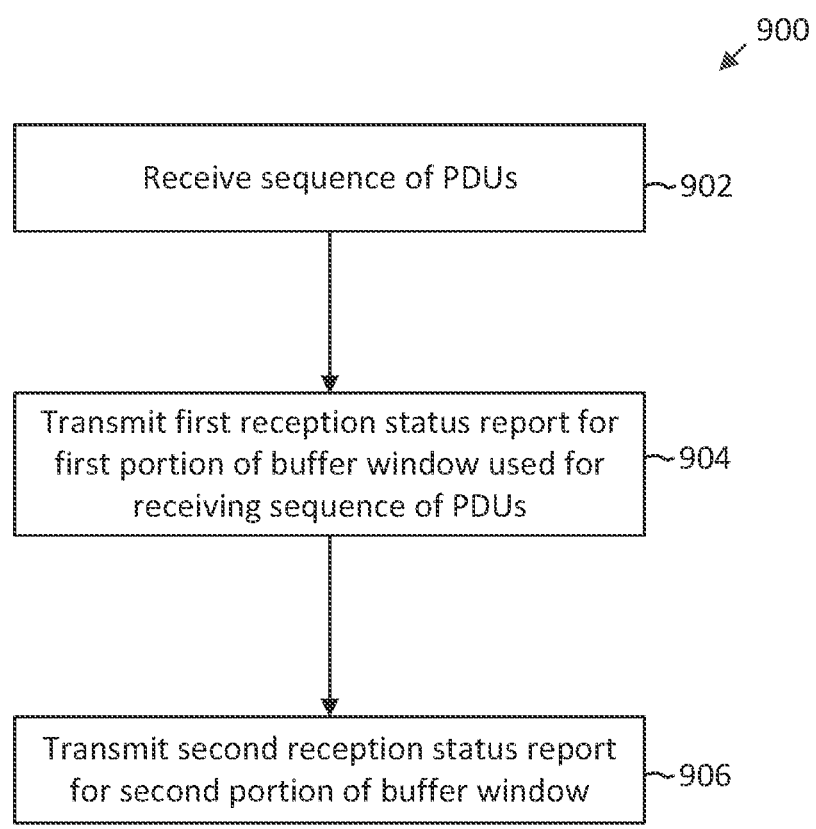
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UE 115 or 300, may utilize one or more components, such as the processor 302, the memory 304, the RLC module 308, the transceiver 310, the modem 312, and the one or more antennas 316, to execute the steps of method 900. The method 900 may employ similar mechanisms as described above with respect to FIGS. 4-7. As illustrated, the method 900 includes a number of enumerated steps, but aspects of the method 900 may include additional steps before, after, and in between the enumerated steps. In some aspects, one or more of the enumerated steps may be omitted or performed in a different order.

At block 902, a first wireless communication device receives a sequence of PDUs from a second wireless communication device. In some instances, the first wireless communication device may correspond to a BS (e.g., the BSs 105 and/or 200) and the second wireless communication device may correspond to a UE (e.g., the UEs 115 and/or 300). In some other instances, the first wireless communication device may correspond to a UE (e.g., the UEs 115 and/or 300) and the second wireless communication device may correspond to a BS (e.g., the BSs 105 and/or 200). In some instances, the sequence of PDUs are RLC data PDUs. In some instances, the first wireless communication device may utilize one or more components, such as the processors 202 and 302, the memory 204 and 304, the RLC modules 208 and 308, the transceivers 210 and 310, the modems 212 and 312, and the one or more antennas 216 and 316, to receive the sequence of PDUs.

At block 904, the first wireless communication device transmits, to the second wireless communication device, a reception status report for a first portion of a buffer window used for receiving the sequence of PDUs. In some instances, the first wireless communication device may utilize one or more components, such as the processors 202 and 302, the memory 204 and 304, the RLC modules 208 and 308, the transceivers 210 and 310, the modems 212 and 312, and the one or more antennas 216 and 316, to transmit the first reception status report.

At block 906, the first wireless communication device transmits to the second wireless communication device, a second reception status report for a second portion of the buffer window, the second portion being different from the first portion. In some instances, the first wireless communication device may utilize one or more components, such as the processors 202 and 302, the memory 204 and 304, the RLC modules 208 and 308, the transceivers 210 and 310, the modems 212 and 312, and the one or more antennas 216 and 316, to transmit the second status report.

In some instances, the method 900 further comprises receiving, by the first wireless communication device from the second wireless communication device, an indication to support reception of a reception status report for a portion of the receiver buffer window other than the entire receiver buffer window. In some instances, the first wireless communication device may utilize one or more components, such as the processors 202 and 302, the memory 204 and 304, the RLC modules 208 and 308, the transceivers 210 and 310, the modems 212 and 312, and the one or more antennas 216 and 316, to receive the indication to support reception of a reception status report for a portion of the receiver buffer window other than the entire receiver buffer window.

In some instances, the method 900 further comprises determining, by the first wireless communication device, that one or more PDUs of the sequence of PDUs was not received. In some instances, the first wireless communication device may utilize one or more components, such as the processors 202 and 302, the memory 204 and 304, the RLC modules 208 and 308, the transceivers 210 and 310, the modems 212 and 312, and the one or more antennas 216 and 316, to determine that one or more PDUs of the sequence of PDUs was not received.

In some aspects, each PDU in the sequence of PDUs is associated with an SN and each of the first and second reception status reports comprises a list of SNs associated with PDUs of the sequence of PDUs, wherein each PDU associated with a SN in the list was not received and an end-acknowledgement SN indicating an exclusive upper bound on PDUs for which information is reported.

In some instances, the method 900 further comprises starting, in response to transmitting the second reception status report, a timer prohibiting the transmission of any status reports until the timer elapses. In some instances, the first wireless communication device may utilize one or more components, such as the processors 202 and 302, the memory 204 and 304, the RLC modules 208 and 308, the transceivers 210 and 310, the modems 212 and 312, and the one or more antennas 216 and 316, to start, in response to transmitting the second reception status report, the timer prohibiting the transmission of any status reports until the timer elapses.

In some instances, the method 900 further comprises refraining from starting, in response to transmitting the first reception status report, a timer prohibiting transmission of any status reports until the timer elapses. In some instances, the first wireless communication device may utilize one or more components, such as the processors 202 and 302, the memory 204 and 304, the RLC modules 208 and 308, the transceivers 210 and 310, and the modems 212 and 312 to refrain from starting the timer.

In some instances, the method 900 further comprises transmitting a BSR indicating the size of the remaining RLC status reports to be transmitted. A BSR may be transmitted after the first RLC status report is transmitted, or alternately, a BSR may be included with the first RLC status report (e.g., in the same transport block). BSRs may also be transmitted with or after subsequent RLC status reports.

In some instances, the second reception status report includes a CPT field indicating that the end-acknowledgement SN of the second reception status report further indicates a SN associated with a next expected PDU by the first wireless communication device.

In some instances, the first reception status report includes a CPT field indicating that the end-acknowledgement SN of the first reception status report corresponds to the upper edge of the first portion of the receiver buffer window used for receiving the sequence of PDUs.

In some instances, the method 900 further comprises receiving, by the first wireless communication device from the second wireless communication device, a next sequence of PDUs based on the end-acknowledgement SN of the second reception status report. In some instances, the first wireless communication device may utilize one or more components, such as the processors 202 and 302, the memory 204 and 304, the RLC modules 208 and 308, the transceivers 210 and 310, the modems 212 and 312, and the one or more antennas 216 and 316, to receive the next sequence of PDUs based on the end-acknowledgement SN of the second reception status report.

In some instances, the second reception status report includes a CPT field indicating that the end-acknowledgement SN of the first reception status report does not indicate a next expected PDU by the first wireless communication device.

In some instances, transmitting the first reception status report at block 904 further comprises a start acknowledgement SN indicating an inclusive lower bound on SNs for which the first reception status report provides information.

In some instances, each PDU in the sequence of PDUs comprises an RLC PDU, and each of the first and second reception status reports comprises an RLC status PDU.

Further aspects of the present disclosure include a method of wireless communication. The method of wireless communication includes transmitting, by a first wireless communication device, a sequence of protocol data units (PDUs). The method also includes receiving, by the first wireless communication device from a second wireless communication device, a first reception status report for a first portion of a receiver buffer window used for receiving the sequence of PDUs. The method also includes receiving, by the first wireless communication device from the second wireless communication device, a second reception status report for a second portion of the receiver buffer window, the second portion being different from the first portion.

The method may also include one or more of the following features. For instance, the method may include transmitting, by the first wireless communication device to the second wireless communication device, an indication to support transmission of a reception status report for a portion of the receiver buffer window other than the entire receiver buffer window. The method may also include receiving, by the first wireless communication device from the second wireless communication device, a buffer status report (BSR) indicating a size of remaining reception status reports to be received from the second wireless communication device. The first wireless communication device receives the BSR after receiving the first reception status report. The receiving the first reception status report includes receiving a communication signal including the BSR and the first reception status report. Each PDU in the sequence of PDUs is associated with a sequence number (SN) and each of the first and second reception status reports includes a list of SNs associated with PDUs of the sequence of PDUs, wherein each PDU associated with a SN in the list has a negative-acknowledgement (NACK) status, and an end-acknowledgement SN indicating an exclusive upper bound on PDUs for which information is reported. The receiving the second reception status report includes receiving, by the first wireless communication device from the second wireless communication device, the second reception status report including a control PDU type (CPT) field indicating that the end-acknowledgement SN of the second reception status report further indicates a SN associated with a next expected PDU from the first wireless communication device. The method may also include transmitting, by the first wireless communication device, a next sequence of PDUs based on the CPT field of the second reception status report. The receiving the first reception status report includes receiving, by the first wireless communication device from the second wireless communication device, the first reception status report including a control PDU type (CPT) field indicating that the end-acknowledgement SN of the first reception status report does not indicate a next expected PDU from the first wireless communication device. The first reception status report includes a control PDU type (CPT) field indicating that the end-acknowledgement SN of the first reception status report corresponds to an upper edge of the receiver buffer window used for receiving the sequence of PDUs. The first reception status report further comprises a start-acknowledgement SN indicating an inclusive lower bound on SNs for which the first reception status report provides information. Each PDU in the sequence of PDUs comprises a Radio Link Control (RLC) PDU, and each of the first and second reception status reports comprises an RLC status PDU.

Further aspects of the present disclosure include a method of wireless communication. For instance, the method may include receiving, by a first wireless communication device from a second wireless communication device, a sequence of protocol data units (PDUs). The method may also include transmitting, by the first wireless communication device to the second wireless communication device, a first reception status report for a first portion of a receiver buffer window used for receiving the sequence of PDUs. The method may also include transmitting, by the first wireless communication device to the second wireless communication device, a second reception status report for a second portion of the receiver buffer window, the second portion being different from the first portion.

The method may also include one or more of the following features. For instance, the method may include receiving, by the first wireless communication device from the second wireless communication device, an indication to support transmission of a reception status report for a portion of the receiver buffer window other than the entire receiver buffer window. The method may include transmitting, by the first wireless communication device to the second wireless communication device, a buffer status report (BSR) indicating a size of remaining reception status reports to be transmitted. The first wireless communication device transmits the BSR after transmitting the first reception status report. Ttransmitting the first reception status report includes transmitting a communication signal including the BSR and the first reception status report. Each PDU in the sequence of PDUs is associated with a sequence number (SN) and each of the first and second reception status reports includes a list of sequence numbers SNs associated with PDUs of the sequence of PDUs, wherein each PDU associated with a SN in the list was not received, and an end-acknowledgement SN indicating an exclusive upper bound on PDUs for which information is reported. The second reception status report includes a control PDU type (CPT) field indicating that the end-acknowledgement SN of the second reception status report further indicates a SN associated with a next expected PDU by the first wireless communication device. The method includes receiving, by the first wireless communication device from the second wireless communication device, a next sequence of PDUs based on the end-acknowledgement SN of the second reception status report. The first reception status report includes a control PDU type (CPT) field indicating that the end-acknowledgement SN of the first reception status report corresponds to an upper edge of the receiver buffer window used for receiving the sequence of PDUs. The second reception status report includes a control PDU type (CPT) field indicating that the end-acknowledgement SN of the first reception status report does not indicate a next expected PDU by the first wireless communication device. The first reception status report further comprises a start-acknowledgement SN indicating an inclusive lower bound on SNs for which the first reception status report provides information. The method includes determining, by the first wireless communication device, that one or more PDUs of the sequence of PDUs was not received. The method includes starting, in response to transmitting the second reception status report, a timer prohibiting transmission of any status reports until the timer elapses. The method includes refraining from starting, in response to transmitting the first reception status report, a timer prohibiting transmission of any status reports until the timer elapses. Each PDU in the sequence of PDUs comprises a Radio Link Control (RLC) PDU, and each of the first and second reception status reports comprises an RLC status PDU.

Further aspects of the present disclosure include an apparatus including a transceiver configured to transmit a sequence of protocol data units (PDUs); receive from a wireless communication device a first reception status report for a first portion of a receiver buffer window used for receiving the sequence of PDUs; and receive from the wireless communication device a second reception status report for a second portion of the receiver buffer window, the second portion being different from the first portion.

The apparatus may also include one or more of the following features. For instance, the transceiver is further configured to transmit to the wireless communication device an indication to support reception of a reception status report for a portion of the receiver buffer window other than the entire receiver buffer window. The transceiver is further configured to receive from the wireless communication device a buffer status report (BSR) indicating a size of remaining reception status reports to be received from the wireless communication device. The transceiver is configured to receive the BSR by receiving from the wireless communication device the BSR after receiving the first reception status report. The transceiver is further configured to receive a communication signal including the BSR and the first reception status report. Each PDU in the sequence of PDUs is associated with a sequence number (SN) and each of the first and second reception status reports includes a list of SNs associated with PDUs of the sequence of PDUs, wherein each PDU associated with a SN in the list has a negative-acknowledgement (NACK) status, and an end-acknowledgement SN indicating an exclusive upper bound on PDUs for which information is reported. The transceiver is configured to receive the second reception status report by receiving from the wireless communication device the second reception status report including a control PDU type (CPT) field indicating that the end-acknowledgement SN of the second reception status report further indicates a SN associated with a next expected PDU. The transceiver is further configured to transmit a next sequence of PDUs based on the CPT field of the second reception status report. The transceiver is configured to receive the first reception status report by receiving from the wireless communication device the first reception status report including a control PDU type (CPT) field indicating that the end-acknowledgement SN of the first reception status report does not indicate a next expected PDU. The first reception status report includes a control PDU type (CPT) field indicating that the end-acknowledgement SN of the first reception status report corresponds to an upper edge of the receiver buffer window used for receiving the sequence of PDUs. The first reception status report further comprises a start-acknowledgement SN indicating an inclusive lower bound on SNs for which the first reception status report provides information. Each PDU in the sequence of PDUs comprises a Radio Link Control (RLC) PDU, and each of the first and second reception status reports comprises an RLC status PDU.

Further aspects of the present disclosure include an apparatus including a transceiver configured to transmit receive from a wireless communication device a sequence of protocol data units (PDUs); transmit to the wireless communication device a first reception status report for a first portion of a receiver buffer window used for receiving the sequence of PDUs; and transmit to the wireless communication device a second reception status report for a second portion of the receiver buffer window, the second portion being different from the first portion.

The apparatus may also include one or more of the following features. For instance, the transceiver is further configured to receive from the wireless communication device an indication to support reception of a reception status report for a portion of the receiver buffer window other than the entire receiver buffer window. The transceiver is further configured to transmit to the wireless communication device a buffer status report (BSR) indicating a size of remaining reception status reports to be transmitted. The transceiver is configured to transmit the BSR by transmitting to the wireless communication device the BSR after transmitting the first reception status report. The transceiver is further configured to transmit a communication signal including the BSR and the first reception status report. Each PDU in the sequence of PDUs comprises a Radio Link Control (RLC) PDU, and each of the first and second reception status reports comprises an RLC status PDU. The apparatus includes a processor configured to determine that one or more PDUs of the sequence of PDUs was not received. The processor may be configured to start, in response to apparatus transmitting the second reception status report, a timer prohibiting transmission of any status reports until the timer elapses. The processor may be configured to refrain from starting, in response to apparatus transmitting the first reception status report, a timer prohibiting transmission of any status reports until the timer elapses. Each PDU in the sequence of PDUs is associated with a sequence number (SN) and each of the first and second reception status reports includes a list of sequence numbers SNs associated with PDUs of the sequence of PDUs, wherein each PDU associated with a SN in the list was not received, and an end-acknowledgement SN indicating an exclusive upper bound on PDUs for which information is reported. The first reception status report includes a control PDU type (CPT) field indicating that the end-acknowledgement SN of the first reception status report corresponds to an upper edge of the receiver buffer window used for receiving the sequence of PDUs. The second reception status report includes a control PDU type (CPT) field indicating that the end-acknowledgement SN of the second reception status report further indicates a SN associated with a next expected PDU. The transceiver is further configured to receive from the wireless communication device a next sequence of PDUs based on the end-acknowledgement SN of the second reception status report. The second reception status report includes a control PDU type (CPT) field indicating that the end-acknowledgement SN of the first reception status report does not indicate a next expected PDU. The first reception status report further comprises a start-acknowledgement SN indicating an inclusive lower bound on SNs for which the first reception status report provides information.

Further aspects of the present disclosure include a non-transitory computer-readable medium having program code recorded thereon. The non-transitory computer-readable medium includes code for causing a first wireless communication device to transmit a sequence of protocol data units (PDUs); code for causing the first wireless communication device to receive from a second wireless communication device a first reception status report for a first portion of a receiver buffer window used for receiving the sequence of PDUs; and code for causing the first wireless communication device to receive from the second wireless communication device a second reception status report for a second portion of the receiver buffer window, the second portion being different from the first portion.

The non-transitory computer-readable medium may also include one or more of the following features. For instance, the non-transitory computer-readable medium may include code for causing the first wireless communication device to transmit to the second wireless communication device an indication to support reception of a reception status report for a portion of the receiver buffer window other than the entire receiver buffer window. Each PDU in the sequence of PDUs is associated with a sequence number (SN) and each of the first and second reception status reports includes a list of SNs associated with PDUs of the sequence of PDUs, wherein each PDU associated with a SN in the list has a negative-acknowledgement (NACK) status, and an end-acknowledgement SN indicating an exclusive upper bound on PDUs for which information is reported. The non-transitory computer-readable medium further includes code for causing the first wireless communication device to receive from the second wireless communication device, a buffer status report (BSR) indicating a size of remaining reception status reports to be received from the second wireless communication device. The code for causing the first wireless communication device to receive the BSR is configured to receive the BSR after receiving the first reception status report. The code for causing the first wireless communication device to receive the first reception status report is further configured to cause the first wireless communication device to receive a communication signal including the BSR and the first reception status report. The code for causing the first wireless communication device to receive the second reception status report further includes code for causing the first wireless communication device to receive from the second wireless communication device the second reception status report including a control PDU type (CPT) field indicating that the end-acknowledgement SN of the second reception status report further indicates a SN associated with a next expected PDU from the first wireless communication device. The non-transitory computer-readable medium further includes code for causing the first wireless communication device to transmit a next sequence of PDUs based on the CPT field of the second reception status report. The code for causing the first wireless communication device to receive the first reception status report includes code for causing the first wireless communication device to receive from the second wireless communication device the first reception status report including a control PDU type (CPT) field indicating that the end-acknowledgement SN of the first reception status report does not indicate a next expected PDU from the first wireless communication device.

The first reception status report includes a control PDU type (CPT) field indicating that the end-acknowledgement SN of the first reception status report corresponds to an upper edge of the receiver buffer window used for receiving the sequence of PDUs. The first reception status report further comprises a start-acknowledgement SN indicating an inclusive lower bound on SNs for which the first reception status report provides information. Each PDU in the sequence of PDUs comprises a Radio Link Control (RLC) PDU, and each of the first and second reception status reports comprises an RLC status PDU.

Further aspects of the present disclosure include a non-transitory computer-readable medium having program code recorded thereon. The non-transitory computer-readable medium includes code for causing a first wireless communication device to receive from a second wireless communication device a sequence of protocol data units (PDUs); code for causing the first wireless communication device to transmit to the second wireless communication device a first reception status report for a first portion of a receiver buffer window used for receiving the sequence of PDUs; and code for causing the first wireless communication device to transmit to the second wireless communication device a second reception status report for a second portion of the receiver buffer window, the second portion being different from the first portion. Each PDU in the sequence of PDUs comprises a Radio Link Control (RLC) PDU, and each of the first and second reception status reports comprises an RLC status PDU. The non-transitory computer-readable medium includes code for causing the first wireless communication device to transmit to the second wireless communication device, a buffer status report (BSR) indicating a size of remaining reception status reports to be transmitted. The code for causing the first wireless communication device to transmit the BSR is configured to transmit the BSR after receiving the first reception status report. The code for causing the first wireless communication device to transmit the first reception status report is further configured to cause the first wireless communication device to transmit a communication signal including the BSR and the first reception status report. The non-transitory computer-readable medium further includes code for causing the first wireless communication device to receive from the second wireless communication device an indication to support reception of a reception status report for a portion of the receiver buffer window other than the entire receiver buffer window. The non-transitory computer-readable medium further includes code for causing the first wireless communication device to start, in response to transmitting the second reception status report, a timer prohibiting transmission of any status reports until the timer elapses. The non-transitory computer-readable further includes code for causing the first wireless communication device to refrain from starting start, in response to transmitting the first reception status report, a timer prohibiting transmission of any status reports until the timer elapses. The non-transitory computer-readable further includes code for causing the first wireless communication device to determine that one or more PDUs of the sequence of PDUs was not received. Each PDU in the sequence of PDUs is associated with a sequence number (SN) and each of the first and second reception status reports includes a list of sequence numbers SNs associated with PDUs of the sequence of PDUs, wherein each PDU associated with a SN in the list was not received, and an end-acknowledgement SN indicating an exclusive upper bound on PDUs for which information is reported. The first reception status report includes a control PDU type (CPT) field indicating that the end-acknowledgement SN of the first reception status report corresponds to an upper edge of the receiver buffer window used for receiving the sequence of PDUs. The second reception status report includes a control PDU type (CPT) field indicating that the end-acknowledgement SN of the first reception status report does not indicate a next expected PDU by the first wireless communication device. The first reception status report further comprises a start-acknowledgement SN indicating an inclusive lower bound on SNs for which the first reception status report provides information. The second reception status report includes a control PDU type (CPT) field indicating that the end-acknowledgement SN of the second reception status report further indicates a SN associated with a next expected PDU by the first wireless communication device. The non-transitory computer-readable further includes code for causing the first wireless communication device to receive from the second wireless communication device a next sequence of PDUs based on the end-acknowledgement SN of the second reception status report.

Further aspects of the present disclosure include an apparatus. The apparatus includes means for transmitting a sequence of protocol data units (PDUs); means for receiving from a wireless communication device a first reception status report for a first portion of a receiver buffer window used for receiving the sequence of PDUs; and means for receiving from the wireless communication device a second reception status report for a second portion of the receiver buffer window, the second portion being different from the first portion.

The apparatus may also include one or more of the following features. For instance, the apparatus includes means for transmitting to the wireless communication device an indication to support reception of a reception status report for a portion of the receiver buffer window other than the entire receiver buffer window. The apparatus includes means for receiving, from the wireless communication device, a buffer status report (BSR) indicating a size of remaining reception status reports to be received from the wireless communication device. The means for receiving the BSR includes means for receiving the BSR after receiving the first reception status report. The means for receiving the first reception status report includes means for receiving a communication signal including the BSR and the first reception status report. Each PDU in the sequence of PDUs is associated with a sequence number (SN) and each of the first and second reception status reports includes a list of SNs associated with PDUs of the sequence of PDUs, wherein each PDU associated with a SN in the list has a negative-acknowledgement (NACK) status, and an end-acknowledgement SN indicating an exclusive upper bound on PDUs for which information is reported. The means for receiving the second reception status report includes means for receiving from the wireless communication device the second reception status report including a control PDU type (CPT) field indicating that the end-acknowledgement SN of the second reception status report further indicates a SN associated with a next expected PDU. The apparatus includes means for transmitting a next sequence of PDUs based on the CPT field of the second reception status report. The means for receiving the first reception status report includes means for receiving from the wireless communication device the first reception status report including a control PDU type (CPT) field indicating that the end-acknowledgement SN of the first reception status report does not indicate a next expected PDU. The first reception status report includes a control PDU type (CPT) field indicating that the end-acknowledgement SN of the first reception status report corresponds to an upper edge of the receiver buffer window used for receiving the sequence of PDUs. The first reception status report further comprises a start-acknowledgement SN indicating an inclusive lower bound on SNs for which the first reception status report provides information. Each PDU in the sequence of PDUs comprises a Radio Link Control (RLC) PDU, and each of the first and second reception status reports comprises an RLC status PDU.

Further aspects of the present disclosure include an apparatus. The apparatus includes means for receiving from a wireless communication device a sequence of protocol data units (PDUs); means for transmitting to the wireless communication device a first reception status report for a first portion of a receiver buffer window used for receiving the sequence of PDUs; and means for transmitting to the wireless communication device a second reception status report for a second portion of the receiver buffer window, the second portion being different from the first portion.

The apparatus may also include one or more of the following features. For instance, the apparatus includes means for receiving from the wireless communication device an indication to support reception of a reception status report for a portion of the receiver buffer window other than the entire receiver buffer window. The apparatus includes means for transmitting, to the wireless communication device, a buffer status report (BSR) indicating a size of remaining reception status reports to be transmitted. The means for transmitting the BSR includes means for transmitting the BSR after transmitting the first reception status report. The means for transmitting the first reception status report includes the means for transmitting the BSR. The apparatus includes means for determining that one or more PDUs of the sequence of PDUs was not received. The apparatus includes means for starting, in response to transmitting the second reception status report, a timer prohibiting transmission of any status reports until the timer elapses. The apparatus includes means for refraining from starting, in response to transmitting the first reception status report, a timer prohibiting transmission of any status reports until the timer elapses. Each PDU in the sequence of PDUs comprises a Radio Link Control (RLC) PDU, and each of the first and second reception status reports comprises an RLC status PDU. Each PDU in the sequence of PDUs is associated with a sequence number (SN) and each of the first and second reception status reports includes a list of sequence numbers SNs associated with PDUs of the sequence of PDUs, wherein each PDU associated with a SN in the list was not received, and an end-acknowledgement SN indicating an exclusive upper bound on PDUs for which information is reported. The first reception status report includes a control PDU type (CPT) field indicating that the end-acknowledgement SN of the first reception status report corresponds to an upper edge of the receiver buffer window used for receiving the sequence of PDUs. The second reception status report includes a control PDU type (CPT) field indicating that the end-acknowledgement SN of the first reception status report does not indicate a next expected PDU. The first reception status report further comprises a start-acknowledgement SN indicating an inclusive lower bound on SNs for which the first reception status report provides information. The second reception status report includes a control PDU type (CPT) field indicating that the end-acknowledgement SN of the second reception status report further indicates a SN associated with a next expected PDU. The apparatus includes means for receiving from the wireless communication device a next sequence of PDUs based on the end-acknowledgement SN of the second reception status report.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first wireless communication device, comprising:
  receiving, from a second wireless communication device, an indication to support transmission of a reception status report for a portion of a receiver buffer window other than the entire receiver buffer window;
  receiving, from the second wireless communication device, a sequence of protocol data units (PDUs) with the receiver buffer window;

transmitting, to the second wireless communication device, a first reception status report associated with a first portion of the receiver buffer window; and transmitting, to the second wireless communication device, a second reception status report associated with a second portion of the receiver buffer window, the second portion being different from the first portion.

2. The method of claim 1, further comprising:
transmitting, by the first wireless communication device to the second wireless communication device, a buffer status report (BSR) indicating a size of remaining reception status reports to be transmitted.

3. The method of claim 2, wherein the first wireless communication device transmits the BSR after transmitting the first reception status report.

4. The method of claim 2, wherein the transmitting the first reception status report includes transmitting a communication signal including the BSR and the first reception status report.

5. The method of claim 1, wherein each PDU in the sequence of PDUs is associated with a sequence number (SN) and each of the first and second reception status reports comprises:
a list of sequence numbers SNs associated with PDUs of the sequence of PDUs, wherein each PDU associated with a SN in the list was not received; and
an end-acknowledgement SN indicating an exclusive upper bound on PDUs for which information is reported.

6. The method of claim 5, wherein the second reception status report includes a control PDU type (CPT) field indicating that the end-acknowledgement SN of the second reception status report further indicates a SN associated with a next expected PDU by the first wireless communication device.

7. The method of claim 6, further comprising:
receiving, by the first wireless communication device from the second wireless communication device, a next sequence of PDUs based on the end-acknowledgement SN of the second reception status report.

8. The method of claim 5, wherein the first reception status report includes a control PDU type (CPT) field indicating that the end-acknowledgement SN of the first reception status report corresponds to an upper edge of the receiver buffer window used for receiving the sequence of PDUs.

9. The method of claim 5, wherein the second reception status report includes a control PDU type (CPT) field indicating that the end-acknowledgement SN of the first reception status report does not indicate a next expected PDU by the first wireless communication device.

10. The method of claim 5, wherein the first reception status report further comprises a start-acknowledgement SN indicating an inclusive lower bound on SNs for which the first reception status report provides information.

11. The method of claim 1, further comprising:
determining, by the first wireless communication device, that one or more PDUs of the sequence of PDUs was not received.

12. The method of claim 1, further comprising:
starting, in response to transmitting the second reception status report, a timer prohibiting transmission of any status reports until the timer elapses.

13. The method of claim 1, further comprising:
refraining from starting, in response to transmitting the first reception status report, a timer prohibiting transmission of any status reports until the timer elapses.

14. The method of claim 1, wherein each PDU in the sequence of PDUs comprises a Radio Link Control (RLC) PDU, and each of the first and second reception status reports comprises an RLC status PDU.

15. A method of wireless communication performed by a first wireless communication device, comprising:
transmitting, to a second wireless communication device, an indication to support transmission of a reception status report for a portion of a receiver buffer window other than the entire receiver buffer window;
transmitting a sequence of protocol data units (PDUs) to the second wireless communication device with the receiver buffer window used for receiving the sequence of PDUs;
receiving, from the second wireless communication device, a first reception status report associated with a first portion of the receiver buffer window; and
receiving, from the second wireless communication device, a second reception status report associated with a second portion of the receiver buffer window, the second portion being different from the first portion.

16. The method of claim 15, wherein each PDU in the sequence of PDUs is associated with a sequence number (SN) and each of the first and second reception status reports comprises:
a list of SNs associated with PDUs of the sequence of PDUs, wherein each PDU associated with a SN in the list has a negative-acknowledgement (NACK) status; and
an end-acknowledgement SN indicating an exclusive upper bound on PDUs for which information is reported.

17. An apparatus comprising:
one or more memories;
one or more transceivers; and
one or more processors coupled to the one or more memories and one or more transceivers, the one or more memories storing instructions that are executable by the one or more processors, individually or in any combination, to cause the apparatus to:
receive from a wireless communication device an indication to support transmission of a reception status report for a portion of a receiver buffer window other than the entire receiver buffer window;
receive from the wireless communication device a sequence of protocol data units (PDUs) with the receiver buffer window;
transmit to the wireless communication device a first reception status report associated with a first portion of the receiver buffer window; and
transmit to the wireless communication device a second reception status report associated with a second portion of the receiver buffer window, the second portion being different from the first portion.

18. The apparatus of claim 17, wherein the one or more processors are further configured, individually or in any combination, to:
transmit to the wireless communication device a buffer status report (BSR) indicating a size of remaining reception status reports to be transmitted.

19. The apparatus of claim 18, wherein the one or more processors are further configured, individually or in any combination, to transmit the BSR by transmitting to the wireless communication device the BSR after transmitting the first reception status report.

20. The apparatus of claim 18, wherein the one or more processors are further configured, individually or in any combination, to transmit a communication signal including the BSR and the first reception status report.

21. The apparatus of claim 17, wherein each PDU in the sequence of PDUs comprises a Radio Link Control (RLC) PDU, and each of the first and second reception status reports comprises an RLC status PDU.

22. The apparatus of claim 17, wherein the one or more processors are is configured, individually or in any combination, to start, in response to apparatus transmitting the second reception status report, a timer prohibiting transmission of any status reports until the timer elapses.

23. The apparatus of claim 17, wherein the one or more processors are is configured, individually or in any combination, to refrain from starting, in response to apparatus transmitting the first reception status report, a timer prohibiting transmission of any status reports until the timer elapses.

24. The apparatus of claim 17, wherein each PDU in the sequence of PDUs is associated with a sequence number (SN) and each of the first and second reception status reports comprises:
   a list of sequence numbers SNs associated with PDUs of the sequence of PDUs, wherein each PDU associated with a SN in the list was not received; and
   an end-acknowledgement SN indicating an exclusive upper bound on PDUs for which information is reported.

25. The apparatus of claim 24, wherein the first reception status report includes a control PDU type (CPT) field indicating that the end-acknowledgement SN of the first reception status report corresponds to an upper edge of the receiver buffer window used for receiving the sequence of PDUs.

26. The apparatus of claim 24, wherein the second reception status report includes a control PDU type (CPT) field indicating that the end-acknowledgement SN of the second reception status report further indicates a SN associated with a next expected PDU.

27. The apparatus of claim 24, wherein the first reception status report further comprises a start-acknowledgement SN indicating an inclusive lower bound on SNs for which the first reception status report provides information.

28. An apparatus comprising:
   one or more memories;
   one or more transceivers; and
   one or more processors coupled to the one or more memories and one or more transceivers, the one or more memories storing instructions that are executable by the one or more processors, individually or in any combination, to cause the apparatus to:
   transmit, to a wireless communication device, an indication to support transmission of a reception status report for a portion of a receiver buffer window other than the entire receiver buffer window;
   transmit a sequence of protocol data units (PDUs) to the wireless communication device with the receiver buffer window used for receiving the sequence of PDUs;
   receive from the wireless communication device a first reception status report associated with a first portion of the receiver buffer window; and
   receive from the wireless communication device a second reception status report associated with a second portion of the receiver buffer window, the second portion being different from the first portion.

29. The apparatus of claim 28, wherein each PDU in the sequence of PDUs is associated with a sequence number (SN) and each of the first and second reception status reports comprises:
   a list of SNs associated with PDUs of the sequence of PDUs, wherein each PDU associated with a SN in the list has a negative-acknowledgement (NACK) status; and
   an end-acknowledgement SN indicating an exclusive upper bound on PDUs for which information is reported.

* * * * *